United States Patent [19]

Nordskog

[11] 4,176,732

[45] Dec. 4, 1979

[54] SELF-PROPELLED AIRCRAFT PASSENGER ELEVATOR

[76] Inventor: Robert A. Nordskog, 18135 Karen Pl., Tarzana, Calif. 91356

[21] Appl. No.: 868,812

[22] Filed: Jan. 12, 1978

[51] Int. Cl.² ............................................. B66F 9/14
[52] U.S. Cl. ................................................... 187/9 E
[58] Field of Search ................... 187/9 E, 9 R, 6, 56; 280/744; 180/27; 280/87.02 W

[56] References Cited

U.S. PATENT DOCUMENTS

| | | | |
|---|---|---|---|
| 3,016,973 | 1/1962 | Williamson | 187/9 E |
| 3,268,033 | 8/1966 | Goodacre | 187/9 E |
| 3,495,849 | 2/1970 | Cetrone | 280/744 |
| 3,937,346 | 2/1976 | Laan | 187/9 E |
| 3,993,207 | 11/1976 | Jones | 180/27 |
| 4,045,045 | 8/1977 | Boucher | 280/87.02 W |

*Primary Examiner*—Robert R. Song
*Attorney, Agent, or Firm*—Matthew P. Lynch

[57] ABSTRACT

An elevator comprising a self-propelled truck and a cab secured thereto and for use especially for transporting invalids and convalescents, the cab being adapted to be selectively lowered or raised relative to ground level by means of a vertical two-stage mast assembly. Electric motors within the truck hydraulically power the mast assembly, front wheels and the steering mechanism of the single rear wheel. Further electrically operated are interior lights, a courtesy light, windshield wiper and defroster fan and a bell effective to provide a warning when the cab is lowered or when the truck is moved in reverse. The square-shaped cab is further provided with all-around tiltable windows, a vent in the cab ceiling, wide sliding doors to facilitate easy access and exit, and bumpers in the cab lower contact areas. A manually positionable ramp aids a wheelchair passenger while boarding or leaving the cab, and an inner foldable safety railing further affords additional safety and support for such passengers.

24 Claims, 6 Drawing Figures

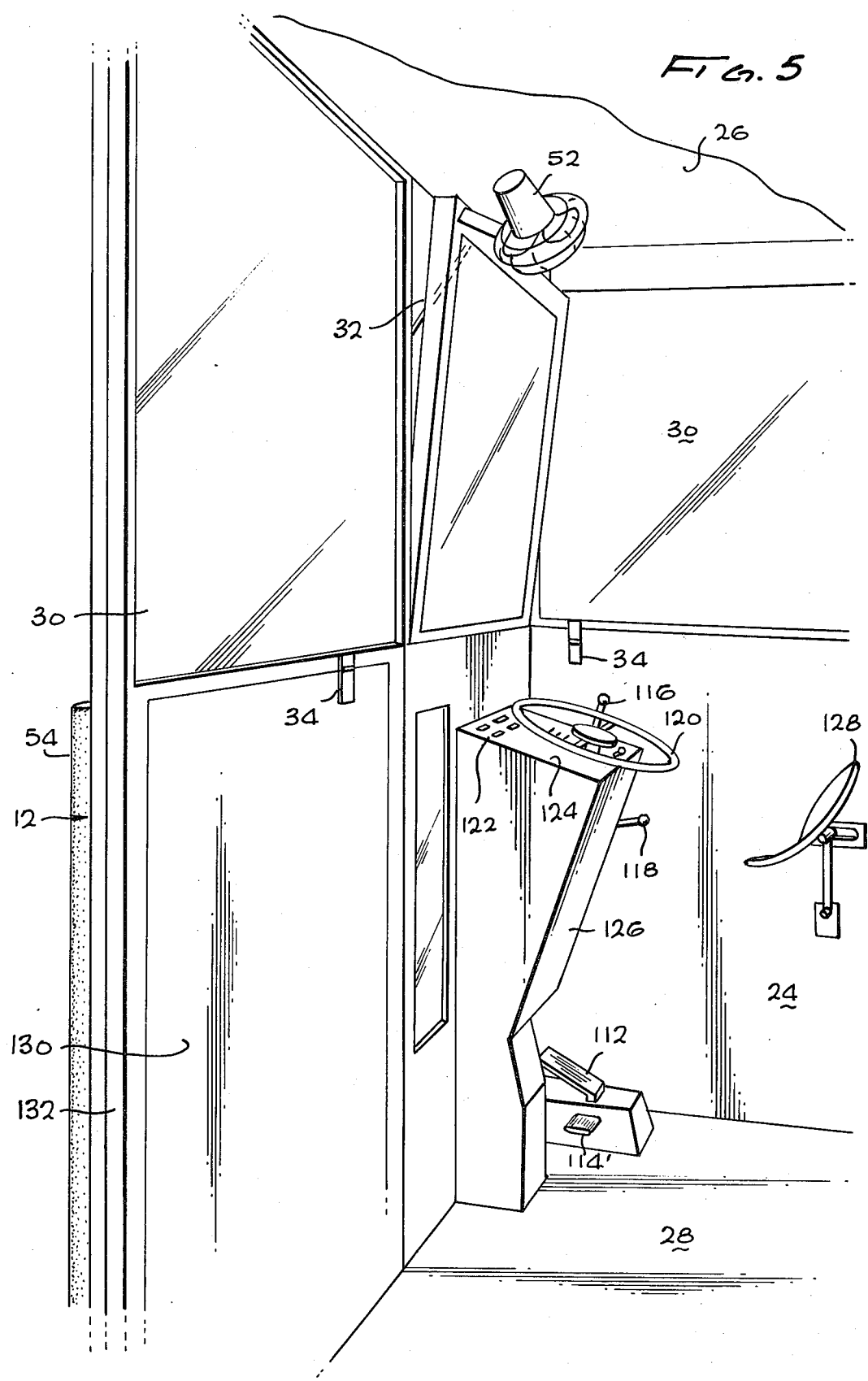

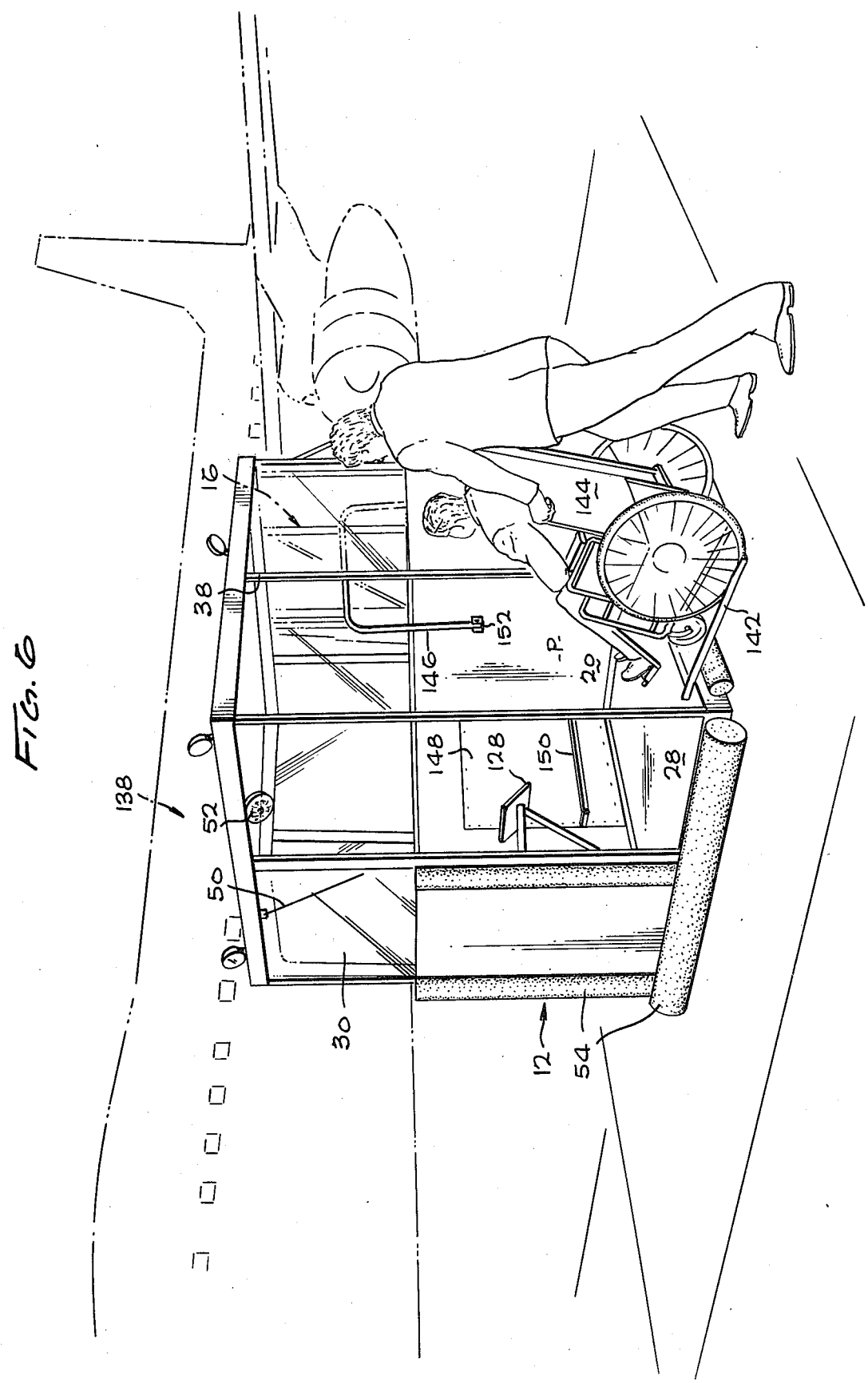

SELF-PROPELLED AIRCRAFT PASSENGER ELEVATOR

BACKGROUND OF THE INVENTION

1. Field of the Invention

The invention relates generally to a passenger carrying lifting platform and, particularly, to a self-propelled, electrically-powered elevating unit especially for use for transporting invalids and convalescents from one level to another level as, for example, from ground surface to the cabin entrance of an aircraft.

2. The Prior Art

In the past it has been extremely cumbersome and problematic for the physically handicapped, particularly invalids or convelescents confined to a wheelchair, to board or leave craft which involved having to be moved from one level to another. A typical example is that where such a handicapped individual has to enter or leave an airplane without the availability of the presently used, stationary boarding ramps which provide a generally horizontal passageway and extend level to level with the cabin door of the plane, this, for instance, at smaller airports which space-wise cannot accommodate such ramps and, instead, employ the commonly used displaceable, staircase-type ramps. In another instance, the aircraft itself may be arranged with a self-contained staircase-type ramp which is lowered from the fuselage of the plane to ground level to enable the passengers to board or to disembark. In any case, the problem as to the facility to confortably admit or enable the invalid to leave the craft without the usual excessive strain on the handicapped has as yet not been resolved by the prior art.

SUMMARY OF THE INVENTION

Object of the present invention is to overcome the aforedescribed drawback and to provide a means to facilitate an invalid or convalescent confined to a wheelchair to comfortably and safely board or leave an airplane without any stress or strain on both the passenger and aircraft personnel.

Therefore, in accordance with the present invention, an elevating unit is provided which comprises a passenger carrying cabin attached to a self-propelled, electrically-powered vehicle or truck adapted to raise the cabin from ground surface to a substantially high ground clearance. The cabin is rectangular in configuration, equipped with substantially wide sliding doors to enable easy access and exit from the cabin, and is provided with all around tiltable windows which afford maximum visibility and ventilation, additional ventilation means being provided in the ceiling of the cabin. A manually positionable ramp facilitates the wheel-chair seated passenger to be wheeled from the cabin onto the plane once the former has been elevated to the level of the cabin entrance of the plane. To provide maximum safety and confidence for the seated passenger, a folding safety railing is provided which encloses the passenger. For loading and unloading the cabin during darkness, interior lights are positioned within the cabin. Addditionally, a courtesy light is mounted within the cabin for the passenger's convenience. The cabin is further equipped with an electric windshield wiper and a defroster fan on the driver's window to ensure ample visibility. A warning bell is operated when the cabin is being lowered or when the elevating unit, as a whole, is moving in reverse. A mast assembly enables the cabin to be hydraulically raised or lowered, as desired, the mast assembly essentially comprising a pair of horizontally spaced apart, upright outer guide rails in the form of U-shaped channels and a pair of horizontally spaced apart upright inner guide rails in the form of U-shaped channels, the inner channels being movable upwardly and downwardly as a unit with respect to the outer channels. Typically, the outer channels at their lower ends are rigidly secured to the lift truck while the inner channels at their upper ends, and rigidly rapidly secured to the cabin and, at their lower ends are coupled and extend in mating relation with the outer channels. Intermediate beam members having an I-shaped configuration between the inner and outer channels to provide for a doube-extension system. The inner channels are actuated vertically by means of a lifting cylinder which is rigidly connected, at its lower end, between the outer channels and, at its upper end rigidly secured to a top brace for the inner channels. A hydraulic pump coupled to and driven by battery powered electric motors supplies fluid the lifting cylinder and a steering cylinder which effects steering movement of the single rear wheel. The operating controls including a brake and accelerator pedal, shift and lift levers, and a steering wheel are positioned in the cabin. To prevent possible damage to the contacting surfaces of both the cabin and the aircraft, the former is provided with inpact-resistant bumpers provided, typically, at the contact surfaces of the cabin.

The elevating unit aforedescribed and in accordance with the invention is relatively easy and economical to fabricate and assemble. Then too, the components thereof are readily accessible for servicing and maintenance.

The above and other objects of the invention will be more readily understood from the following description considered in connection with the accompanying drawings in which:

BRIEF DESCRIPTION OF THE DRAWINGS

FIG. 5 is an elevation view seen from the left side of the cabin of the unit of FIG. 1, illustrating the controls; and FIG. 6 is a plan view, illustrating a wheelchair-seated person as being wheeled into the cabin of the unit of FIG. 1, and showing the cabin entrance of the aircraft onto which the cabin is to be raised.

DESCRIPTION OF THE PREFERRED EMBODIMENT

Figure 1:
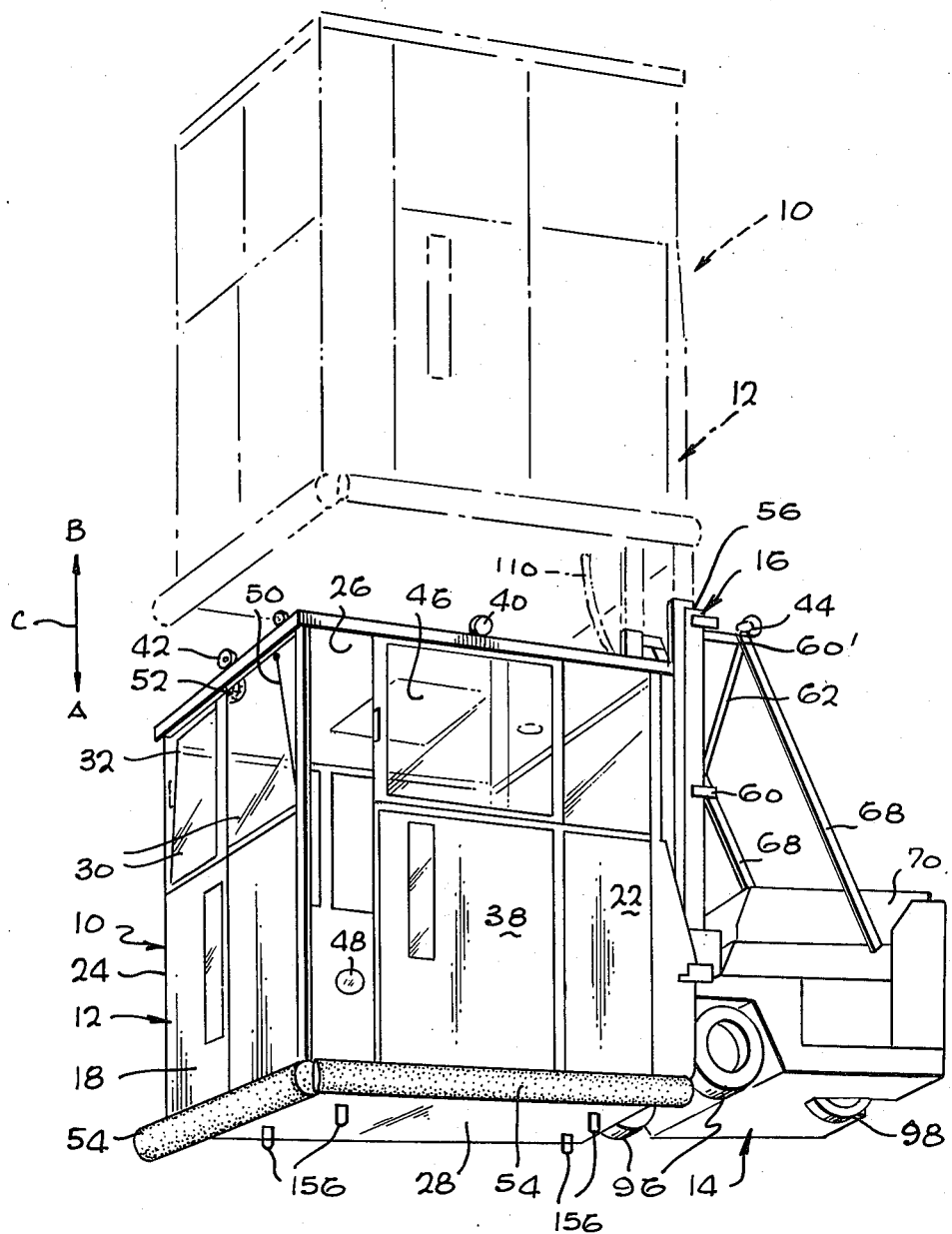
FIG. 1 is a perspective view of an elevating unit in accordance with the invention, illustrating the cabin in normal lower position and, in broken lines, the cabin in elevated position.
Figure 2:
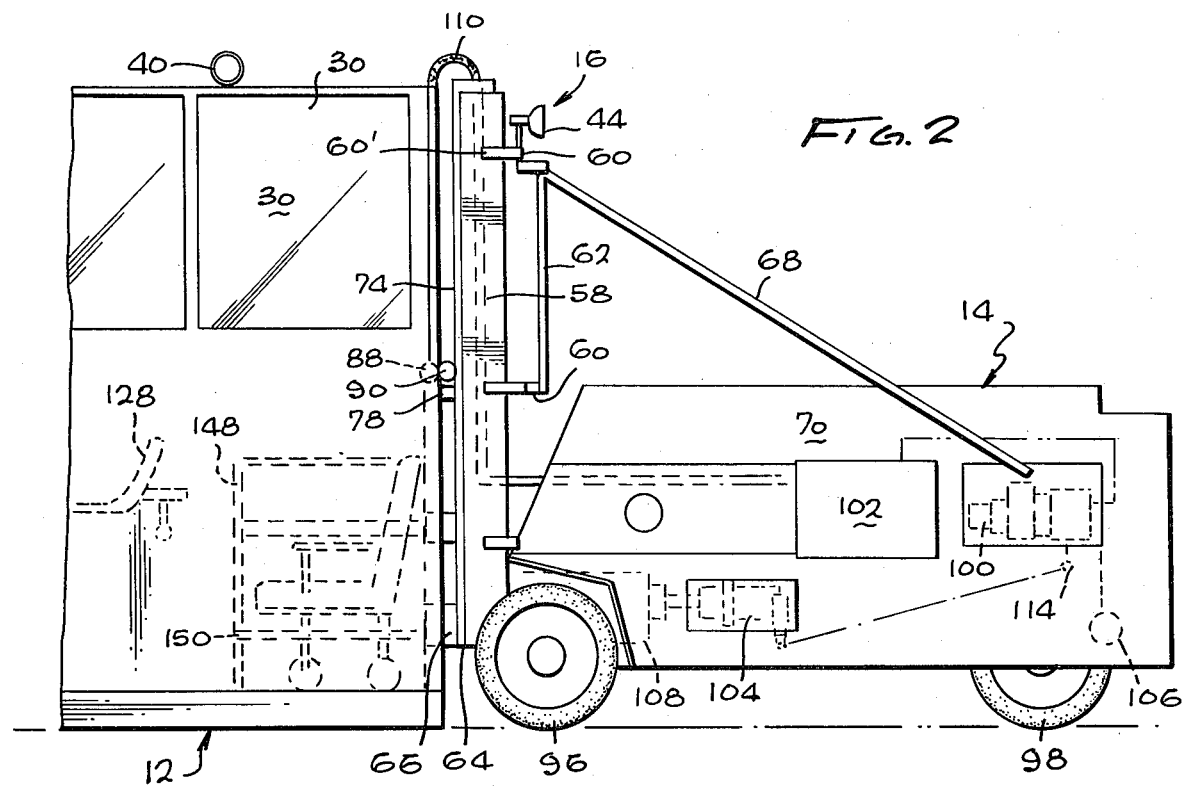
FIG. 2 is an elevation, part sectional view of the left side of the elevating unit of FIG. 1.
Figure 3:
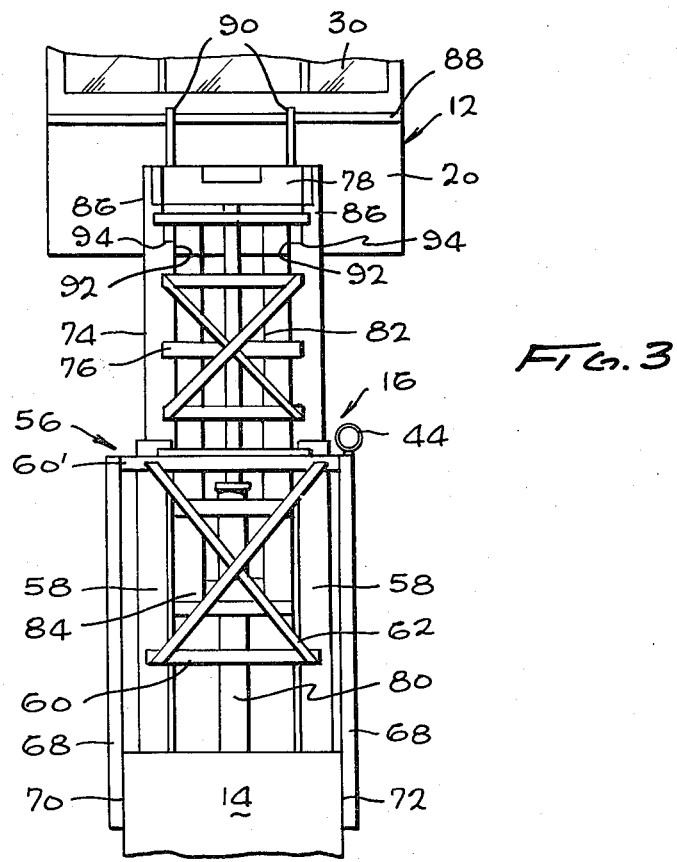
FIG. 3 is an elevation, part sectional view, taken at the rear of the elevating unit of FIG. 1, illustrating the mast assembly and manner of securing the cabin to the lift vehicle, the former being shown in elevated position.

Referring now to the drawings in which like reference numerals index like parts and with attention initially directed to FIGS. 1, 2, and 3, the numeral 10 designates the elevating unit in accordance with the present invention. Generally considered, unit 10 comprises a cabin 12 and a lifting vehicle 14, the latter being arranged to raise or lower the cabin by means of a lift assembly 16.

Considering at first cabin 12, the latter is seen to be rectangular in configuration and comprises a front a rear wall 18, 20, opposite side walls 22, 24 and a roof and floor 26, 28. The walls 18, 20, 22, and 24 are equipped with spaceous windows 30 which extend all-around the cabin from side-to-side of the walls. The windows of plexiglass have a height such that when a person is seated on a wheel-chair, the windows are at least eye level so as to provide minimum ground visibility for the seated passenger and maximum, all direction visibility for the driver. As shown at 32, the windows are tiltable about hinges 34 to provide ventilation of air within the cabin. To further facilitate ventilation of cabin 12, the roof 26 thereof is formed with a fan 36. Slidable doors 38, one shown in FIG. 1, which constitute part of the front and side walls, are provided and are of substantial width so as to enable easy access into and exit from the cabin. Mounted on the ceiling or top 26 of cabin 12 are three flood lights 40. A bell 42 is provided and sounds when the cabin is being lowered or when the lifting unit 10 is moving in reverse. A rear light 44 is further mounted on the lift assembly 16. Interior lights 46, shown for illustration purposes only as being mounted in roof 26, FIG. 1, provides adequate light for passenger convenience while travelling in the dark. An electric windshield wiper 50 and a defroster fan 52 ensure adequate visibility during adversed weather condition, the wiper 50 and 52 being shown as positioned on the safety glass windshield at the driver's side of the cabin, as is illustrated in more detail in FIG. 5. To avoid possible damage to the contacting surfaces of cabin 12 and an aircraft, the former is provided with bumpers 54 made of a shock-absorbing material. The bumpers are positioned at the lowermost end of cabin 12 and outwardly from bottom 28, in a plane substantially parallel therewith and also in a vertical orientation at the front contacting surface of the cab.

Further details as to the interior, controls, and additional features of the cabin will be discussed hereinafter with respect to FIG. 5.

Referring now to the lift assembly 16 of FIG. 1 through 4, a mast 56 enables cabin 12 to move thereon in a vertical plane between a lower position A and a higher position B, as indicated by arrow C, FIG. 1, and vice versa from B to A, as desired. Mast 56 comprises a pair of horizontally spaced apart upright outer members or guide rails 58, in the form of channel irons having a U-shaped configuration. The outer guide members 58 are rigidly formed together by a plurality of vertically spaced apart cross braces to which are welded thereto and an X-brace 62 welded to the braces 60 and 60¹. At their lower ends 64, FIG. 2, outer members 58 are welded and supported to base or frame 66 of lifting vehicle or truck 14. Further supporting outer members 58 relative to lifting truck 14 are a pair of horizontally spaced apart, elongated support bars 68 which are welded at their upper ends to the top cross brace 60¹ and at their lower ends welded to the side walls 70, 72 of truck 14. As will be noted, during lifting operation of lift assembly 16, the outer guide members 58 remain stationary with lifting truck 14.

Mast 56 further comprises a pair of horizontally spaced apart upright inner members or guide rails 74, in the form of channel irons having a U-shaped configuration. The inner guide members are rigidly formed together by a plurality of spaced apart cross braces 76 which are welded therebetween and a top brace 78. The inner guide members 74 extend in mating relation with the members 58 and are movable upwardly and downwardly as a unit with respect to the outer guide members 58 by means of a lifting cylinder 80 which is rigidly connected at its lower end by a clamp member, not shown, attached to and between the outer guide members 58. The upper end of lifting cylinder 80 is rigidly connected to the top brace 78 for the inner members 74. An intermediate I-shaped beam, not shown, is provided between inner and outer guide members 58, 74 to form a double extension system, the I-shaped beam being mounted between the members 58, 74 by rollers, not shown, which abuttingly engage the inner surfaces of the aforementioned members. A conventional follower chain 82 is provided and secured to a bracket 84. It is to be noted that operation of inner guide members 74 relative to the outerqmembers 58 is conventional and need not be discussed in further detail.

Cabin 12, at its rear wall 20, is rigidly secured to the upper ends 86 of the interconnected inner guide members 74. To this end, a cross bar 88 extends horizontally across wall 20 and welded to bar 88 are a pair of horizontally spaced apart mounting members 90 which, in turn, are rigidly secured to upper ends 86 of inner guide members 74 by top brace 78 which, in turn, is rigidly secured to wall 20 by an suitable means as, for instance, by bolts, welding, or the like. Inner guide members 74 at their inner opposing faces 92 are stepped to form inwardly oriented shoulders 94 which, as shown, serve as stops to prevent any axial movement of mounting members 90 in downward direction.

Referring presently to FIG. 1 and 2, lifting truck 14 is seen to be a three-wheeled vehicle having a pair of front wheels 96 and a single rear wheel 98. As discussed hereinbefore, lift assembly 16 is positioned intermediate the front end of truck 14 and rear wall 20 of cabin 12. Housed within the interior of truck 14 is an electrically-powered hydraulic pump 100 driven by battery elements 102 and which supplies operating fluid to a hydraulic steering cylinder 106 which effects steering movement of the rear wheel 98. A second electrically-powered hydraulic pump 104, 108 supplies operating fluid to the lifting cylinder 80 for actuating the lift assembly 16. A cable assembly 110 comprising a plurality of individual conductors and hoses now shown, connects the operating controls in the cabin with the hydraulically and electrically actuated elements in the lifting truck 14.

As shown in detail in FIG. 5, operating controls are located in cabin 12 and comprise an accelerator pedal 112, a brake pedal 114 connected to brakes on the drive wheels 96, a manual shift lever 116 for direction of travel, a manual control lever 118 for controlling the raising and lowering of lift assembly 16, a steering wheel 120, and fan, exterior dome, courtesy and wiper switches, etc., designated generally by the numeral 122 positioned on a dash board 124. Spaced rearwardly from steering column compartment 126 is a back-rest 128 against which the driver rests or leans while driving the lifting unit. Window hinges 34 enable windows 30 to be tiled to enable ventilation of cabin 12. Typically, the interior walls of cabin 12 are carpeted with suitable carpeting 130. In the arrangement shown in FIG. 5, a bumper 54 is positioned vertically adjacent a sliding door 132.

Figure 4:
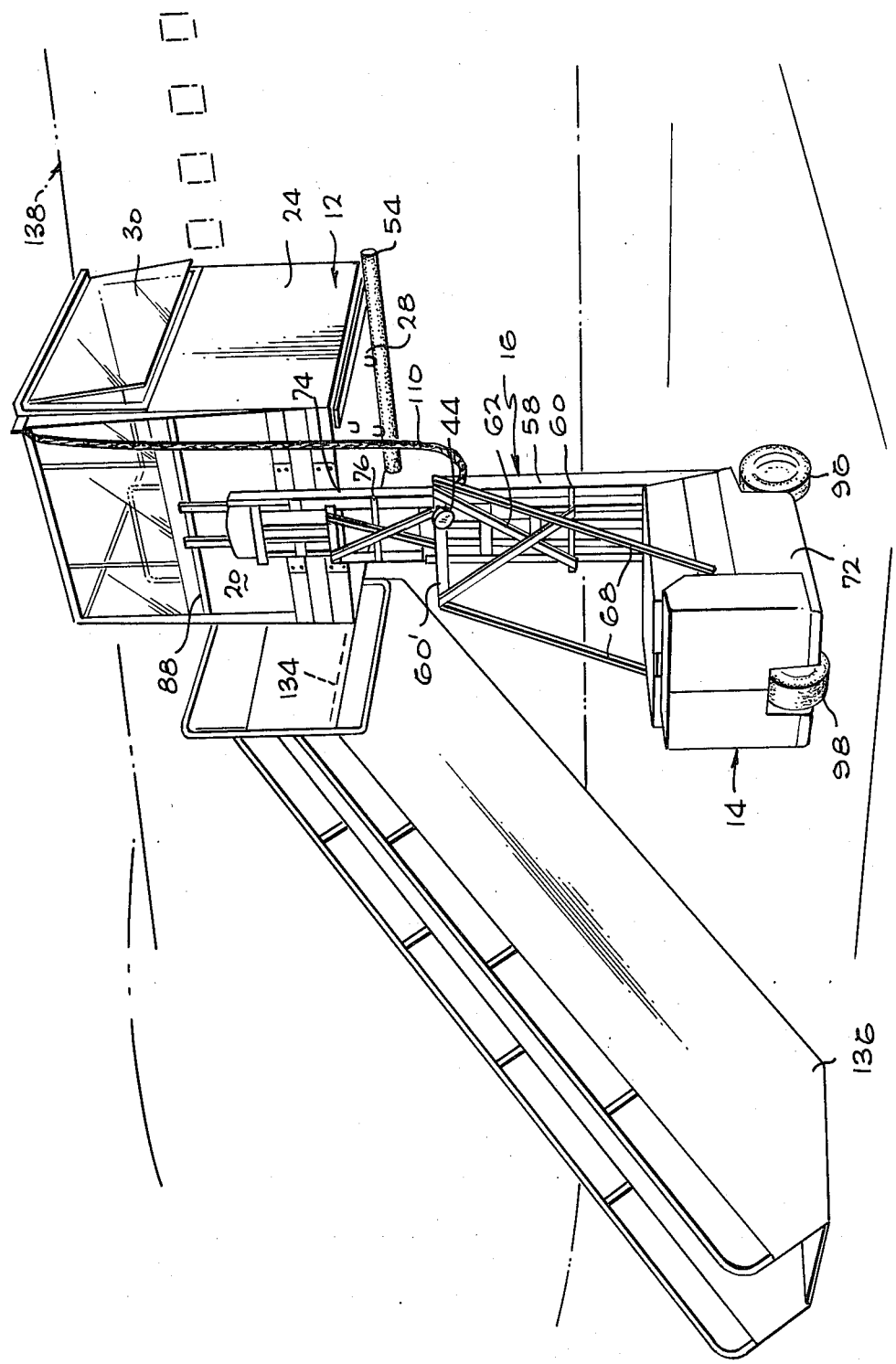
FIG. 4 is a perspective view of the elevating unit of FIG. 1, illustrating the unit in elevated position adjacent the cabin entrance of an airplane.

In the arrangement shown in FIG. 4, the cabin 12 has been raised in the manner described hereinbefore and is positioned adjacent the planar top or landing 134 of a conventional staircase-type ramp 136 ready to load or unload passengers from an airplane 138. The sliding door 140 at the left side of cabin 12 has been opened to permit a wheelchaired passenger to enter the cabin from the plane 138 via landing 134 of ramp 136. Following entry and positioning of the handicapped passenger in cabin 12, the cabin will be lowered in the described fasion and the lifting truck will head for the terminal.

FIG. 6 shows a wheelchaired invalid or convalescent as being wheeled into cabin 12 via a portable ramp 142 which interconnects ground surface with floor 28 of cabin 12. Following entry of the handicapped passenger into the cabin, the wheelchair 144 along with the passenger is wheeled into a position marked P. Upon such positioning, a folding safety railing 146 positioned and mounted on rear wall 20 of cabin 12, is lowered and positioned about the seated passenger for purposes of safety and assurance to the passenger. Also, upon positioning of the passenger at position P, the portable ramp 142 is positioned in upright orientation in ramp holder 148 mounted on wall 24 of the cabin, the ramp holder 146 including a ramp holding bracket 150. The railing 146, at one of its lower connecting ends, is mounted to wall 20 by means of a servo-lock 152 which enables the railing to be positioned at a selected position intermediate the vertical and horizontal. Although the servo-lock 152 is shown as being positioned to the right of the position where the passenger is to be seated, it will be appreciated that the lock may equally well be positioned to the passenger's left side.

Typically, in the rest or lowered position of cabin 12, floor 28 thereof has a clearance of about 3" above ground so as to prevent any possibility of an attendant's foot or feet from getting caught beneath floor 28 when cabin 12 is being lowered to ground. In order to move the lift unit to a given destination, i.e., the airplane 154, the unit 10 is initially raised to a ground clearance of about 6". To ensure the ground clearance of 3", the lower surface of floor 28 is provided with integral stops 156, FIG. 1. The travelling speed of lift unit 10, preferably, is preset. Typically, a speed of 6-8 m.p.h. may be reached with cabin 12 in the lowered or down position while a maximum speed of 2-3 m.p.h. can be reached with cabin 12 in the elevated or up position.

In the preferred arrangement of the invention, lift unit 10 has an overall height of 100", an overall length of 160", an overall width of 80" and an overall weight of 9,200 lbs. The cabin itself has a 6'×6' passenger compartment area which enables three people to be moved and lifted from ground level to the passenger entrance of a plane, and vice versa. Finally, the unit 10, typically, has a turning radius of 160".

While the invention has been shown and described in terms of a preferred embodiment, it will be obvious to those skilled in the art that various substitutions, modifications, omissions, and changes may be made in the embodiment without departing from the scope of the invention.

What is claimed is:

1. In a self-propelled elevating unit:
    a substantially square-shaped cabin adapted to be raised and lowered from one level to another, said cabin including sliding doors providing easy access and exit therefrom, and all-around windows to provide maximum ground visibility;
    a self-propelled vehicle for moving said cabin from one location to another, said vehicle including a pair of horizontally-spaced driven front ground wheels a driving rear wheel centrally at the rear of said vehicle for providing directional movement thereto, and a frame and a housing mounted on said frame;
    a lift assembly intermediate said cabin and said vehicle, said lift unit including a mast oriented upwardly relative to said vehicleEand comprising a first pair of lower stage guide members horizontally spaced and rigidly secured at their lower ends to said frame and housing of said vehicle, and a second pair of upper stage guide members horizontally spaced rigidly secured to said cabin at the rear end thereof, an extendable and retractable lifting member and chain assembly associated with said latter member for effecting telescoping up-and downward movement of said second upper stage guide members relative to said first lower stage guide members to thereby raise and lower said cabin from said one level to the other;
    means for mounting said upper stage guide members to said cabin;
    stop means for preventing displacement of the mounting means relative to said cabin;
    electrically-powered, hydraulically actuating propulsion units in said vehicle within said housing thereof for transmitting motive power to said pair of driven front ground wheels, said lifting member and to said rear wheel to effect steering movement of said latter wheel; and
    operating control means in said cabin for controlling said self-propelled vehicle and said cabin.

2. The elevating unit of claim 1, wherein said sliding doors are of generally wide configuration.

3. The elevating unit of claim 2, wherein said sliding doors are formed both in the front and side wall of said cabin.

4. The elevating unit of claim 1, wherein said all-around windows are formed in the two pairs of opposing walls of said cabin.

5. The elevating unit of claim 4, wherein one of said windows constitutes a windshield for a driver operating said unit.

6. The elevating unit of claim 5, wherein said windows except said windshield are made of plexiglass.

7. The elevating unit of claim 6, wherein said windshield is made of safety glass.

8. The elevating unit of claim 5, wherein said windshield is associated with a windshield wiper and defroster fan.

9. The elevating unit of claim 4, wherein said windows are tiltable to enable ventilation of said cabin.

10. The elevating unit of claim 1, wherein said cabin includes means for accommodating a wheel-chaired passenger, said means including a predetermined location for said passenger in said cabin and a safety railing encircling the passenger.

11. The elevating unit of claim 1, wherein said cabin is provided with interior lights enabling loading and unloading of passengers during darkness.

12. The elevating unit of claim 1, wherein said cabin is provided with interior dome lights.

13. The elevating unit of claim 1, wherein said cabin is provided with an interior courtesy light for the passenger's convenience.

14. The elevating unit of claim 1, wherein said cabin includes a roof top and wherein lamps are mounted on said roof top.

15. The elevating unit of claim 1, wherein said cabin includes a roof top and wherein a flashing beacon is mounted on said roof top.

16. The elevating unit of claim 1, wherein said cabin includes a roof and wherein a ventilation unit is mounted in said roof.

17. The elevating unit of claim 1, wherein said cabin includes a driver's backrest rearwardly of said control means.

18. The elevating unit of claim 1, wherein shock absorbing bumpers are mounted on the contact areas of said cabin and disposed on the front wall thereof in vertical orientation and the bottom of said cab in horizontal orientation and extending outwardly therefrom, parallel with said bottom.

19. The elevating unit of claim 1, wherein said cabin comprises a bottom and wherein stop members are mounted on said bottom to prevent the latter from touching ground surface in the lowered position of the cabin.

20. The elevating unit of claim 1, wherein said sliding doors are provided in the frnt and side walls of said cabin and constitute part of said walls.

21. In a self-propelled elevating unit:
- a passenger cabin adapted to be raised and lowered from one level to another, said cabin including structural means providing easy access and exit therefrom;
- a vehicle for moving said cabin from one location to another, said vehicle including a pair of driven front ground wheels on opposite sides of said vehicle, a rear wheel centrally of said vehicle for providing directional movement of said vehicle, a frame and a housing mounted on said frame;
- a lift assembly intermediate said cabin and said vehicle, said lift assembly including a mast comprising a first lower stage rigidly secured to said frame and said housing of said vehicle, and a second upper stage rigidly secured to said cabin at the rear end thereof, and an extendable and retractable lifting member for effecting up and downward movement of said second stage relative to said first stage to thereby raise and lower said cabin from said one level to another;
- An electrically-powered, hydraulically actuating propulsion unit for transmitting motive power to said pair of driven from ground wheels, to said lifting member and to said rear wheel to ffect steering movement of said latter wheel;
- operating control means in said cabin comprising means for controlling said propulsion unit; and said cabin including means for accomodating a wheel-chaired passenger, said latter means including a predetermined location for said passenger in said cabin and a safety railing encircling the passenger.

22. The elevating unit of claim 21, wherein said safety railing is foldably attached to an inner wall of said cabin and positionable between a normal vertical rest position and an operative horizontal passenger-encircling position.

23. The elevating unit of claim 22, wherein said safety railing is U-shaped and one of its mounting ends is provided with a servo-lock enabling said railing to be positioned intermediate its horizontal and vertical position.

24. The elevating unit of claim 21, wherein said cabin further comprises a portable ramp and ramp holder detachably retaining said ramp against one of the inner side walls of said cabin, said ramp being adapted to form a passageway for a wheel-chaired person between two substantially aligned surfaces.

* * * * *